US008843240B2

(12) United States Patent
Piccirillo et al.

(10) Patent No.: US 8,843,240 B2
(45) Date of Patent: Sep. 23, 2014

(54) LOADING A STEAM TURBINE BASED ON FLOW AND TEMPERATURE RAMPING RATES

(75) Inventors: John Piccirillo, Schenectady, NY (US); Steven Di Palma, Schenectady, NY (US); Dileep Sathyanarayana, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 893 days.

(21) Appl. No.: 12/956,810

(22) Filed: Nov. 30, 2010

(65) Prior Publication Data

US 2012/0131917 A1 May 31, 2012

(51) Int. Cl.
| | |
|---|---|
| *F01K 13/00* | (2006.01) |
| *F22G 5/12* | (2006.01) |
| *F01K 13/02* | (2006.01) |
| *F02C 6/18* | (2006.01) |
| *F02C 9/16* | (2006.01) |
| *F01K 23/10* | (2006.01) |

(52) U.S. Cl.
CPC . *F01K 13/02* (2013.01); *F22G 5/12* (2013.01); *F02C 6/18* (2013.01); *Y02E 20/16* (2013.01); *F02C 9/16* (2013.01); *F01K 23/101* (2013.01)
USPC ............................... 700/287; 60/645; 60/670

(58) Field of Classification Search
None
See application file for complete search history.

(56) References Cited

U.S. PATENT DOCUMENTS

| | | | | |
|---|---|---|---|---|
| 3,879,616 | A | * 4/1975 | Baker et al. ................. | 290/40 R |
| 3,896,623 | A | 7/1975 | Daniels | |
| 3,915,124 | A | * 10/1975 | Kuhn et al. .................... | 122/115 |
| 3,922,859 | A | * 12/1975 | Durrant et al. .................. | 60/665 |
| 4,019,467 | A | * 4/1977 | Binstock .................... | 122/406.5 |
| 4,068,475 | A | * 1/1978 | Binstock ......................... | 60/646 |

(Continued)

FOREIGN PATENT DOCUMENTS

| | | | |
|---|---|---|---|
| DE | 102008044417 A1 | * 2/2009 | ............. G06F 17/50 |
| JP | 2003120216 A | 4/2003 | |

(Continued)

OTHER PUBLICATIONS

Gough, B., "Advanced Control of Steam Superheat Temperature on a Utility Boiler", 2000, Universal Dynamics Tecnhologies Inc., Richmond, Canada.*

(Continued)

*Primary Examiner* — Mohammad Ali
*Assistant Examiner* — Kelvin Booker
(74) *Attorney, Agent, or Firm* — Sutherland Asbill & Brennan LLP

(57) ABSTRACT

Systems and methods for loading a steam turbine are provided. A method may include: receiving a turbine loading factor; receiving a current steam turbine exhaust temperature; determining a steam flow ramping rate parameter and a steam temperature ramping rate parameter based at least in part on the turbine loading factor and the current steam turbine exhaust temperature, wherein the steam flow ramping rate parameter and the steam temperature ramping rate parameter are determined based at least in part on an inverse relationship between the steam flow ramping rate parameter and the steam temperature ramping rate parameter. The method may further include controlling at least one of: (a) steam flow to the steam turbine based at least in part on the steam flow ramping rate parameter; or (b) steam temperature to the steam turbine based at least in part on the steam temperature ramping rate parameter.

19 Claims, 4 Drawing Sheets

(56) References Cited

U.S. PATENT DOCUMENTS

| | | | |
|---|---|---|---|
| 4,149,386 A * | 4/1979 | Luongo et al. | 60/663 |
| 4,164,849 A * | 8/1979 | Mangus | 60/679 |
| 4,208,882 A | 6/1980 | Lopes et al. | |
| 4,253,308 A * | 3/1981 | Eggenberger et al. | 60/664 |
| 4,289,114 A * | 9/1981 | Zadiraka | 126/587 |
| 4,290,850 A * | 9/1981 | Omori et al. | 376/210 |
| 4,296,730 A * | 10/1981 | Zadiraka | 126/592 |
| 4,455,614 A * | 6/1984 | Martz et al. | 700/288 |
| 4,576,124 A * | 3/1986 | Martens et al. | 122/406.5 |
| 4,578,944 A * | 4/1986 | Martens et al. | 60/39.182 |
| 4,589,255 A * | 5/1986 | Martens et al. | 60/646 |
| 4,598,551 A * | 7/1986 | Dimitroff et al. | 60/646 |
| 4,827,429 A | 5/1989 | Silvestri, Jr. | |
| 5,046,318 A * | 9/1991 | Hwang et al. | 60/646 |
| 5,369,951 A * | 12/1994 | Corbett et al. | 60/39.3 |
| 5,379,588 A * | 1/1995 | Tomlinson et al. | 60/39.182 |
| 5,412,936 A * | 5/1995 | Lee et al. | 60/801 |
| 5,540,045 A * | 7/1996 | Corbett et al. | 60/39.3 |
| 5,720,164 A * | 2/1998 | Corbett et al. | 60/39.53 |
| 6,173,563 B1 | 1/2001 | Vakil et al. | |
| 6,502,402 B1 | 1/2003 | Smith et al. | |
| 6,526,755 B1 * | 3/2003 | Harpster | 60/690 |
| 6,978,620 B2 | 12/2005 | Cooper et al. | |
| 7,065,970 B2 * | 6/2006 | Harpster | 60/685 |
| 7,243,618 B2 * | 7/2007 | Gurevich | 122/7 R |
| 7,328,587 B2 * | 2/2008 | Shaffer et al. | 62/228.1 |
| 7,421,853 B2 * | 9/2008 | Shaffer et al. | 62/500 |
| 7,421,854 B2 * | 9/2008 | Shaffer et al. | 62/500 |
| 7,621,133 B2 | 11/2009 | Tomlinson et al. | |
| 7,785,539 B2 * | 8/2010 | Mirkovic et al. | 422/105 |
| 7,926,277 B2 * | 4/2011 | Harpster | 60/685 |
| 8,169,101 B2 * | 5/2012 | Hinders et al. | 290/52 |
| 8,176,723 B2 * | 5/2012 | Welch et al. | 60/39.182 |
| 8,256,219 B2 * | 9/2012 | Hinders et al. | 60/641.2 |
| 8,281,590 B2 * | 10/2012 | Hinders et al. | 60/641.1 |
| 8,347,827 B2 * | 1/2013 | Travaly et al. | 122/467 |
| 8,499,561 B2 * | 8/2013 | Kluge et al. | 60/653 |
| 2005/0109032 A1 * | 5/2005 | Harpster | 60/685 |
| 2005/0160748 A1 * | 7/2005 | Shaffer et al. | 62/228.1 |
| 2005/0160749 A1 * | 7/2005 | Shaffer et al. | 62/228.1 |
| 2005/0160750 A1 * | 7/2005 | Shaffer et al. | 62/228.1 |
| 2006/0150630 A1 * | 7/2006 | Harpster | 60/685 |
| 2007/0271938 A1 * | 11/2007 | Shaffer | 62/228.1 |
| 2008/0208429 A1 * | 8/2008 | Saravanapriyan et al. | 701/100 |
| 2009/0178409 A1 * | 7/2009 | Shinnar | 60/645 |
| 2009/0222108 A1 * | 9/2009 | Lou et al. | 700/29 |
| 2010/0043433 A1 * | 2/2010 | Kelly | 60/641.2 |
| 2010/0043435 A1 * | 2/2010 | Hinders et al. | 60/645 |
| 2010/0043640 A1 * | 2/2010 | Kelly | 96/86 |
| 2010/0045034 A1 * | 2/2010 | Hinders et al. | 290/7 |
| 2010/0077722 A1 | 4/2010 | Sengar et al. | |
| 2010/0162721 A1 * | 7/2010 | Welch et al. | 60/778 |
| 2010/0263607 A1 * | 10/2010 | Travaly et al. | 122/476 |
| 2010/0305768 A1 * | 12/2010 | Holt et al. | 700/288 |
| 2011/0056201 A1 * | 3/2011 | Kluge et al. | 60/653 |
| 2011/0099971 A1 * | 5/2011 | Supahan et al. | 60/39.182 |
| 2011/0146276 A1 * | 6/2011 | Sathyanarayana et al. | 60/646 |
| 2012/0073293 A1 * | 3/2012 | Welch et al. | 60/660 |
| 2012/0102950 A1 * | 5/2012 | Turchi | 60/641.15 |
| 2012/0111288 A1 * | 5/2012 | Malavasi et al. | 122/235.15 |

FOREIGN PATENT DOCUMENTS

| | | | |
|---|---|---|---|
| JP | 2010156332 A | * | 7/2010 |
| JP | 2010276026 A | * | 12/2010 |
| JP | 2011132951 A | * | 7/2011 |
| WO | 2009156299 A2 | | 12/2009 |

OTHER PUBLICATIONS

Quinkertz, R.; Ulma, A.; Gobrecht, E. and Wechsung, M., "USC Steam Turbine Technology for Maximum Efficiency and Operational Flexibility", Oct. 2008, Power-Gen Asia 2008.*

Lo, K.L.; Zeng, P.L.;Marchand, E. and Pinkerton, A., "Modelling and State Estimation of Power Plant Steam Turbines", Mar. 1990, IEEE Proceedings, vol. 137, Pt. C, No. 2.*

OptiControls Inc., "Steam Temperature Control", Sep. 2010, Retrieved from the Internet on Aug. 14, 2013 at "blog.opticontrols.com/archives/182".*

Ning, C.N. and Lu, C.N., "Effects of Temperature Control on Combined Cycle Unit Output Response", Nov. 2006,IEEE Region 10 Conference (TENCON 2006).*

O'Brien, H.G. and Ditto, S.J., "A Control System for a Gas-Cooled Nuclear Power Plant", Nov. 2007 IEEE Transactions on Nuclear Science, vol. 13, Iss. 1.*

Hitzel, R. and Block, F., "Retrofitting Steam Turbines with Modern Control Platforms", Dec. 9-11, 2003, PowerGEN 2003, Siemens AG.*

Chaibakhsh, A. and Graffari, A., "Steam Turbine Model", 2008, Simulation Modelling Practice and Theory, vol. 16, pp. 1145-1162.*

Ganapathy, V., "Heat Transfer: Heat-Recovery Steam Generators: Understanding the Basics", Aug. 1996, Chemical Engineering.*

Smuts, J., "Control Notes: Steam Temperature Control", Sep. 8, 2010, Retrieved from the Internet on May 1, 2014, at "blog.opticontrols.com/archives/182".*

Wright, J.S., "GE Power Generation: Steam Turbine Cycle Optimization, Evaluation, and Performance Testing Considerations", 1996, GE Company.*

Zivkovic, D., "Nonlinear Mathematical Model of the Condensing Steam Turbine", Aug. 15, 2000, Facta Universitatis, Series: Mechanical Engineering, vol. 1, No. 7, pp. 871-878.*

Quinkertz, R.; Ulma, A.; Gobrecht, E. and Wechsung, M., "USC Steam Turbine Technology for Maximum Efficiency and Operational Flexibility", Oct. 21-23, 2008, Power-Gen, Asia 2008, Kuala Lumpur, Malaysia.*

Search Report and Written Opinion for corresponding European Application No. 11189654.4-2321, dated Dec. 19, 2012.

* cited by examiner

LOADING A STEAM TURBINE BASED ON FLOW AND TEMPERATURE RAMPING RATES

TECHNICAL FIELD

The invention relates generally to control systems, and more particularly relates to providing methods and systems for loading a steam turbine.

BACKGROUND OF THE INVENTION

Combined cycle power systems include one or more gas turbines and heat recovery steam generators ("HRSGs") and a steam turbine. Traditional combined cycle system startup procedures include low load limits of the gas turbine and restrictions on the gas turbine loading rate to control the rate of increase in steam temperature. These limits and restrictions contribute to air emissions during the startup event, may increase starting and loading time, and may increase fuel consumption during starting and loading.

Recent improvements to combined cycle power systems allow the gas turbine to be started and loaded independently from the start of the steam turbine by utilizing both parallel and cascading steam bypass paths for steam pressure control and terminal attemperators for steam temperature control. As a result of these recent improvements, the gas turbine can be loaded to base load as quickly as possible independent of the steam turbine starting requirements. Therefore, it is possible that steam generation can reach much higher levels early in the startup.

To increase power generation in early startup it becomes beneficial to consume as much of the generated steam as possible. However, steam turbine constraints (e.g., stress, differential expansion, clearances, etc.) may limit the rate at which the steam consumption can rise, without comprising any of these steam turbine constraints, namely excessive moisture. Similar principles apply when loading other steam systems and controlling steam temperatures apart from combined cycle power systems, such as steam turbines and boilers.

Thus, there exists a need for improved methods and systems for loading a steam turbine.

BRIEF DESCRIPTION OF THE INVENTION

Embodiments of the invention can address some or all of the needs described above. According to one embodiment, a method for loading a steam turbine is provided. The method may include: receiving a turbine loading factor; receiving a current steam turbine exhaust temperature; determining a steam flow ramping rate parameter and a steam temperature ramping rate parameter based at least in part on the turbine loading factor and the current steam turbine exhaust temperature, wherein the steam flow ramping rate parameter and the steam temperature ramping rate parameter are determined based at least in part on an inverse relationship between the steam flow ramping rate parameter and the steam temperature ramping rate parameter. The method may further include controlling at least one of: (a) steam flow to the steam turbine based at least in part on the steam flow ramping rate parameter; or (b) steam temperature to the steam turbine based at least in part on the steam temperature ramping rate parameter.

According to another embodiment, a system for loading a steam turbine is provided. The system may include a controller in communication with one or more temperature sensors associated with a steam turbine exhaust path, one or more steam bypass paths between a gas turbine and the steam turbine, and one or more attemperators of the steam turbine. The controller may be operable to: receive a turbine loading factor; receive a current steam turbine exhaust temperature from the one or more temperature sensors associated with the steam turbine exhaust path; determine a steam flow ramping rate parameter and a steam temperature ramping rate parameter based at least in part on the turbine loading factor and the current steam turbine exhaust temperature, wherein the steam flow ramping rate parameter and the steam temperature ramping rate parameter are determined based at least in part on an inverse relationship between the steam flow ramping rate parameter and the steam temperature ramping rate parameter. The controller may further be operable to control at least one of: (a) steam flow to the steam turbine based at least in part on the steam flow ramping rate parameter; or (b) steam temperature to the steam turbine based at least in part on the steam temperature ramping rate parameter.

According to yet another embodiment, a method for loading a steam turbine is provided. The method may include: defining a linear relationship between a steam flow ramping rate and a steam temperature ramping rate; adjusting the rate of increase of a steam flow rate to a steam turbine during loading based on the linear relationship; and adjusting the rate of increase of a steam temperature to the steam turbine during loading based on the linear relationship.

Other embodiments and aspects of the invention will become apparent from the following description taken in conjunction with the following drawings.

DETAILED DESCRIPTION OF THE INVENTION

Figure 1:
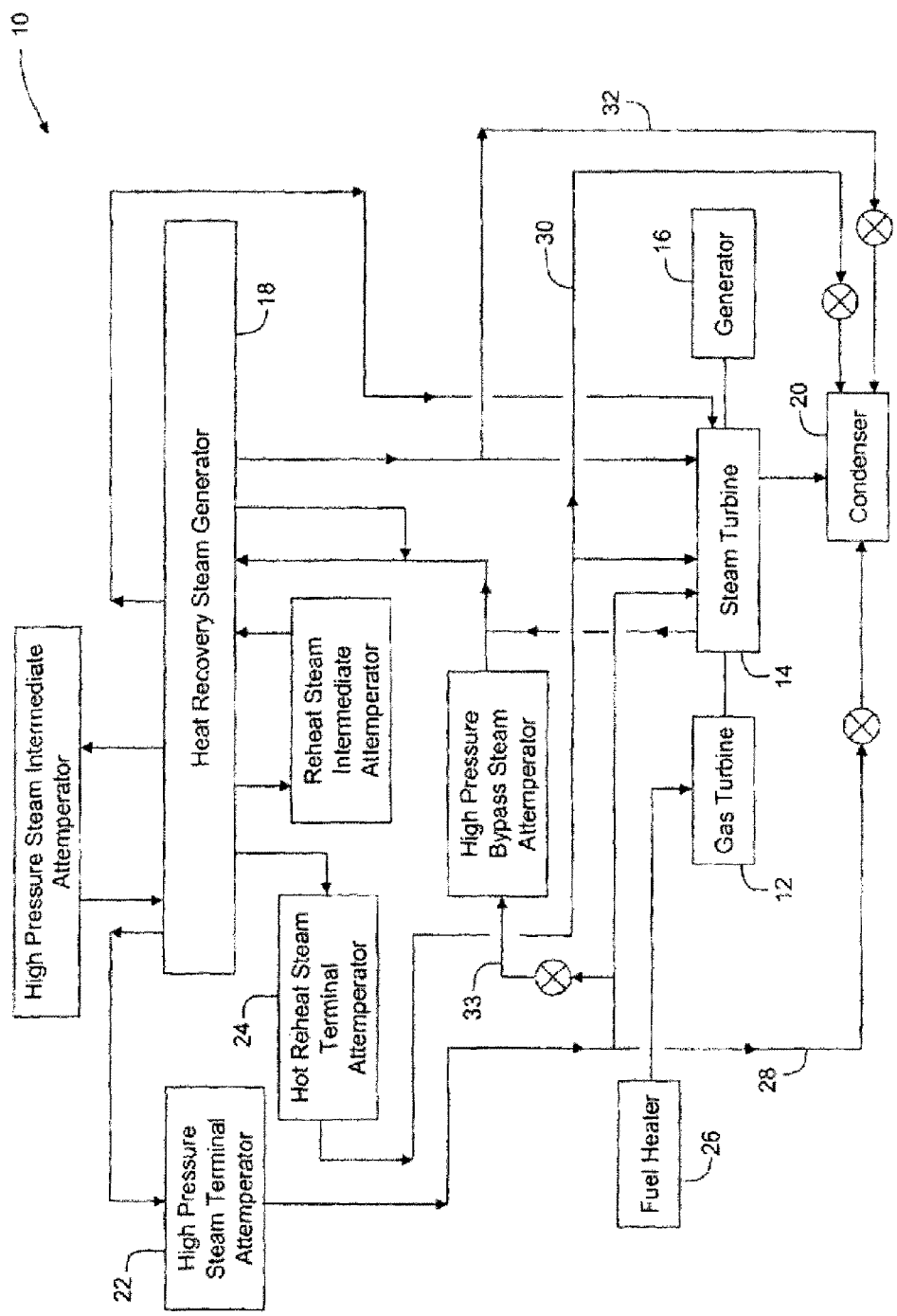
FIG. 1 is a schematic block diagram illustrating a combined cycle power generation system, according to an example embodiment.

Example embodiments of the invention now will be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

According to an example embodiment of the invention, the loading of a steam turbine, such as, but not limited to, a steam turbine of a combined cycle power generation system, can be controlled to allow controlling the ramping rate (or rate of increasing delivery, also referred to interchangeably herein as "loading") of steam flow and steam temperature based on a predetermined relationship between the two. An algorithm (also referred to interchangeably herein as "a function" or "a relationship") can be defined that allows proportional control of the steam flow loading and steam temperature loading of the steam turbine to enhance or improve steam consumption while not violating steam turbine constraints. According to one embodiment, this algorithm defines a linear relationship between the amount of steam flow ramping and the amount of steam temperature ramping and is dependent upon steam turbine exhaust temperatures, such that along a continuum of current turbine exhaust temperatures, as the ramp rate for one is increased, the ramp rate for the other is decreased linearly. The ramp rate for each of the steam flow and steam temperature is further dependent upon an overall turbine loading factor that defines the general loading profile for the turbine, typically based on a number of turbine constraints that are not necessarily tied to individual levels of steam and/or temperature control. However, as described below, the relationship between the steam flow ramping and the steam temperature ramping may be defined according to any number of mathematical relationships. Effectively, according to these methods and systems, the algorithm allows splitting the overall turbine loading factor between the rate the steam flow is increased and the rate the steam temperature is increased, such that as the rate of change for one is increased, the rate of change for the other is increased less (or not at all) during loading of the turbine.

According to some embodiments, the algorithm defining the relationship between the steam flow ramping rate and the steam temperature ramping rate defines at least three different loading profiles: a first profile in which only the steam flow is increased and the steam temperature control is maintained according to the overall loading factor; a second profile that, upon reaching a first predefined exhaust temperature, the steam flow ramping is decreased and the steam temperature ramping is increased, which continues until reaching a predefined upper limit temperature; and a third profile in which, upon reaching the predefined upper limit exhaust temperature, steam temperature ramping is decreased and steam flow ramping is increased. In some circumstances, during loading and upon reaching or exceeding the first predefined exhaust temperature, the turbine loading will generally occur such that steam flow ramping and steam temperature ramping are apportioned according to a linear (or non-linear) relationship. It may be that, during loading of the steam turbine, temperatures will start high (e.g., at a high superheat) and be reduced, then increased again. This reduction and increase of superheat temperatures may generally occur within this second profile between the first predefined exhaust temperature and the predefined upper limit temperature. As exhaust temperatures are reduced, steam flow loading is decreased and temperature ramping is increased, and as exhaust temperatures are then increased again (as a result in part of the temperature ramping), steam flow loading is increased and temperature ramping is decreased.

Example embodiments are now described with reference to FIGS. 1-4.

While the methods and systems described herein are in the context of a combined cycle power system used in an electric utility power generation environment, it is contemplated that the methods and systems described herein may find utility in other applications. In addition, the principles and teachings set forth herein are applicable to turbines using a variety of combustible fuels such as, but not limited to, natural gas, gasoline, kerosene, diesel fuel, and jet fuel. In addition, such startup techniques can be utilized in connection with both multi-shaft and single-shaft combined cycle systems. The following description is, therefore, set forth only by way of illustration, and is not intended to be limiting. As used herein, the term "steam turbine" is not limited to steam turbines of a combined cycle power system, but may include steam turbines in other uses, boilers, or any other machinery or system for which steam flow and temperature can be adjusted during operation.

FIG. 1 provides a schematic illustration of a combined cycle power generation system 10, according to one embodiment. A combined cycle power generation system 10 includes a gas turbine 12 and a steam turbine 14 coupled to a generator 16. The steam turbine 14 is connected by multiple conduits to a heat recovery steam generator (HRSG) 18 and its exhaust is connected to a condenser 20. As stated, references to combined cycle power generations systems are provided for illustrative purposes and embodiments are not limited thereto.

In the embodiment illustrated in FIG. 1, the combined cycle power generation system 10 includes at least one attemperator 22 at the discharge terminal of the high pressure superheater and at least one attemperator 24 located at the discharge terminal of the reheater in the HRSG 18. Additional attemperators may be provided according to other embodiments, such as in a distributed or redundant configuration. The HRSG 18 may have a once-through, or a drum type, evaporator which is capable of tolerating daily startup and loading of the gas turbine 12 at an enhanced or improved rate with normal life span and maintenance.

During startup and loading of the gas turbine 12 and the steam turbine 14, the attemperators 22, 24 operate to control the temperature of high pressure and hot reheat steam generated by the HRSG 18 that is supplied to the steam turbine 14, such as by controlling the temperature of the steam delivered to a high pressure portion and to an intermediate or low pressure portion, respectively. The control and adjustments to the attemperators 22, 24 are provided by a turbine controller, such as is described with reference to FIG. 4, according to the steam flow and temperature ramping algorithm described in more detail with reference to FIGS. 2-3.

The combined cycle power generation system 10 may also include a fuel gas heater 26 for heating fuel supplied to the gas turbine 12. In an example embodiment, such heating can be performed using an auxiliary boiler and intervening heat exchanger between the auxiliary boiler steam outlet and the gas fuel line. Heating the fuel during startup provides the advantage of a faster loading of the gas turbine 12 as compared to loading without such fuel heating. More particularly, heating fuel with an auxiliary heat source provides the ability to, during startup, perform gas turbine loading at an enhanced or improved rate. Specifically, heating the fuel utilizing heat from an auxiliary source allows for uninterrupted loading at an enhanced or improved rate to facilitate reducing with lowest exhaust emissions to maximizing load.

Figure 2:
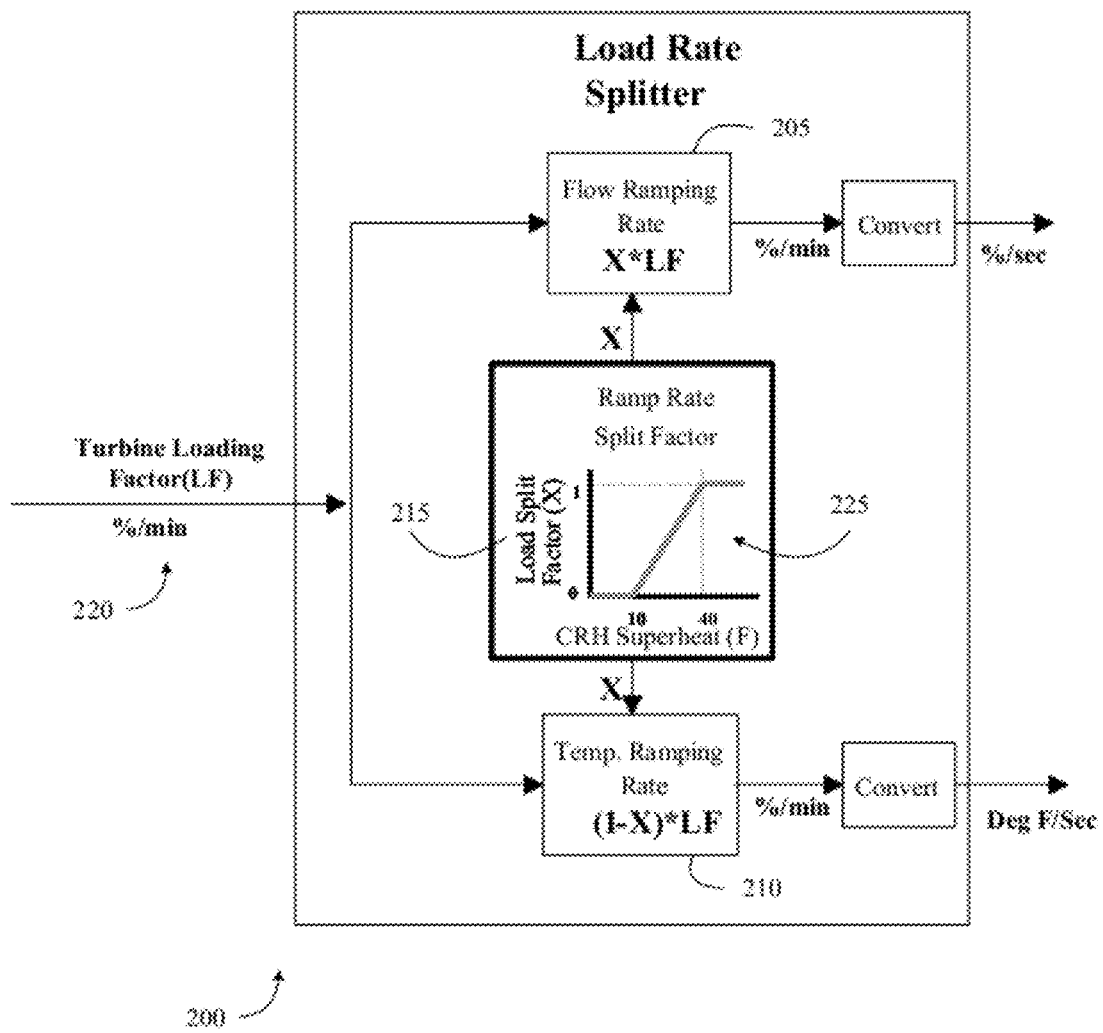
FIG. 2 is a logical block diagram illustrating a method for loading a steam turbine, according to an example embodiment.
Figure 3:
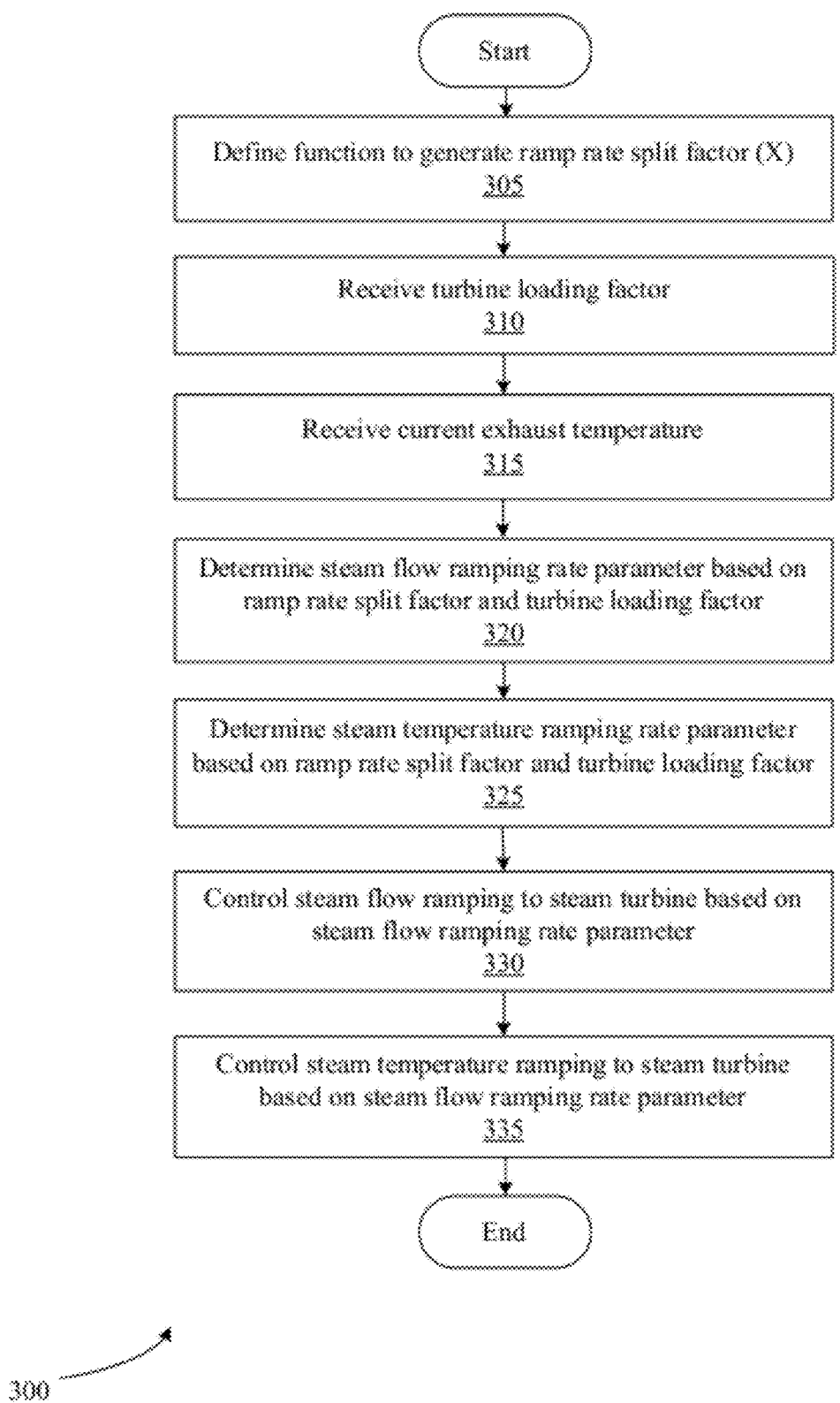
FIG. 3 is a flowchart illustrating a method for loading a steam turbine, according to an example embodiment.

According to one embodiment, the combined cycle power generation system 10 further includes one or more bypass paths, such as the bypass paths 28, 30 32 from the HRSG 18 to the condenser 20 and the bypass path 33 from the high pressure steam line to the cold reheat steam piping, that provide alternate high pressure steam flow paths while the steam turbine admission valves are modulated to control the loading of the steam turbine 14, such as according to the steam flow and temperature ramping algorithm described in more detail with reference to FIGS. 2-3. Additional bypass paths may be provided according to other embodiments, such as in a distributed or redundant configuration. The bypass paths 28, 33 include valves that are modulated to control the pressure of the high pressure steam and the rate of increase of high pressure steam pressure in response to control commands from the turbine controller. The bypass path 30 provides an alternate path for the hot reheat steam while the intermediate pressure control valve is modulated during steam turbine loading. The steam bypass path 32 provides an alternate path for the low pressure steam while the steam turbine low pressure admission valve is modulated during steam turbine loading.

FIG. 2 provides a logical block diagram 200 illustrating the operations for loading a steam turbine by apportioning the steam flow ramping rate and the steam temperature ramping rate, according to one embodiment. The operations illustrated represent an example relationship between the steam flow ramping rate parameter 205 and the steam temperature ramping rate parameter 210, as generally determined by a ramp rate split factor (X) 215, which would be stored and operatively provided utilizing a turbine controller to control attemperators and/or bypass paths as generally discussed with reference to FIG. 1. As shown, an overall turbine loading factor 220 may be initially provided, which indicates the overall loading profile for the steam turbine that is determined according to a number of system constraints. The turbine loading factor 220 indicates the general rate of increasing the load of the steam turbine, expressed as a percent increase per period of time (e.g., %/minute, etc.). It is appreciated that as the steam turbine is being loaded, this turbine loading factor 220 may be adjusted. For example, during initial start-up and load, it may indicate a greater increase in the load (e.g., a higher %/minute), and after some period of time, the loading factor may be reduced. In response, the controller can be operable to dynamically determine the steam flow and steam temperature ramping rates parameters 205, 210 based on the current (or near real-time) value of the turbine loading factor 220 and the calculated ramp rate split factor 215.

To determine the ramp rate split factor 215, a function (or algorithm) 225 can be defined such that the ramp rate split factor 215 is dependent upon a measured or sensed condition of the steam turbine, for example, the exhaust temperature or superheat temperature as shown by FIG. 2 along the x axis of the function 225. Thus, depending upon the value of the steam turbine exhaust temperature or superheat temperature, the function 225 dictates the value of the ramp rate split factor 215. It is appreciated that the function can be any of a number of mathematical equations or other representations that define a desired relationship between a steam flow ramping rate and a steam temperature ramping rate. Example functions 225 may indicate a linear relationship or a non-linear relationship between the steam flow ramping rate parameter 205 and the steam temperature ramping rate parameter 210.

The actual impact of the ramp rate split factor 215 on defining the steam flow ramping rate parameter 205 and the steam temperature ramping rate parameter 210 may be characterized by other equations which generally create an inverse relationship between the rate of increase of the steam flow ramping rate parameter 205 as compared to rate of increase of the steam temperature ramping rate parameter 210. As shown in FIG. 2, one set of equations may be defined as follows: the steam flow ramping rate parameter=ramp rate split factor (X)$\times$ loading factor; and the steam temperature ramping rate parameter=(1−ramp rate split factor (X))$\times$ loading factor. Accordingly, as the ramp rate split factor 215 increases (e.g., as the exhaust temperature or superheat temperature increases), the steam flow ramping rate parameter 205 will increase but the steam temperature ramping rate parameter 210 will decrease. Conversely, as the exhaust temperature decreases, the ramp rate split factor decreases 215 and the steam flow ramping rate parameter 205 will decrease while the steam temperature ramping rate parameter 210 will increase. By increasing the steam temperature ramping rate parameter 210 at lower exhaust temperatures, relative to the steam flow ramping rate parameter 205, will cause the steam temperatures to increase within the turbine. Note that a decrease in the steam flow or steam temperature ramping rate parameters 205, 210 does not necessarily mean that the flow or temperature will be decreased, but that the rate of increasing either of those will decrease. For example, decreasing a steam flow ramping rate parameter 205 may simply cause the steam to be delivered at an increasing rate that is less than the increasing rate it was previously being delivered.

According to one embodiment in which the ramp rate split factor 215 is dependent upon the steam turbine exhaust temperature, such as is shown by FIG. 2, there may be more than one ramping profiles represented by the function 225. For example, a first ramping profile may be for the condition during exhaust temperatures lower than a predefined lower boundary temperature (e.g., "10" in FIG. 2). During this first ramping profile, the ramp rate split factor 215 may be set to zero (or another low number), such that the steam flow ramping is held constant or increased only slightly, while the steam temperature is increased significantly. A second ramping profile may be represented by the angled line shown having an increasing slope along the y direction and increasing from a ramp rate split factor 215 of zero to one. This second profile may exist between the lower boundary temperature and an upper boundary temperature (e.g., "40" in FIG. 2), which may be defined based at least in part on steam turbine constraints (e.g., saturation temperature, superheat, moisture development, etc.). Thus, as the exhaust temperature decreases between this upper boundary and lower boundary, the value of the ramp rate split factor 215 decreases, which in turn causes the steam flow ramping to decrease and the steam temperature ramping to increase. Finally, a third profile may exist at the top end of the exhaust temperature, such that for exhaust temperatures at or above the upper boundary, little or no temperature ramping is performed, and significant steam flow ramping is performed (e.g., equal to the loading factor). According to one embodiment, at least the lower boundary is determined based at least in part on the saturation temperature for a certain exhaust condition, such that the function 225 increases the ramp rate split factor (X) 215 when approaching the saturation point (e.g., from the right to the left on FIG. 2), causing the temperature ramp rate to increase, and moving away from the saturation point. According to one embodiment, the upper boundary is defined based at least in part on another turbine constraint. It is appreciated that the function 225 is provided for illustrative purposes, and that any number of mathematical relationships may be defined and operatively implemented by the turbine controller to determine the levels of steam flow ramping and steam temperature ramping such that they are dependent on each other.

Also represented by FIG. 2 is the operation of converting the steam flow ramping rate parameter 205 and the steam temperature ramping rate parameter 210 into usable engineering units. Engineering units allow issuing control commands to the steam bypass path or paths and attemperator or attemperators. Because, according to one embodiment, the loading factor is provided in percent increase over time (e.g., %/minute), the steam flow ramping rate parameter 205 may be calibrated to a different time unit, such as, but not limited to, percent increase per second (e.g., %/second). A different time unit may be desirable to allow more precise control of the bypass paths, for example. In other examples, the steam flow ramping rate parameter 205 may be calibrated to a volume per unit of time or a pressure per unit of time. Similarly, the steam temperature ramping rate parameter 210 may be calibrated to reflect temperature change per unit of time, such as, but not limited to, degrees Fahrenheit/second. In other embodiments, the loading factor may have different units and/or represent a different type of loading command (e.g., volume per unit of time, power per unit of time, etc.), which may be calibrated for each of the steam flow ramping rate parameter 205 and the steam temperature ramping rate parameter 210 as desired.

Accordingly, after having determined the steam flow ramping rate parameter 205 and the steam temperature ramping rate parameter 210, and performing any recalibration and/or unit adjustments, the turbine controller may issue control commands to one or more of the steam bypass paths to adjust the rate of delivery of steam into the steam turbine and/or to one or more of the attemperators to adjust the temperature of steam being delivered to the steam turbine, allowing for more efficient, but relatively safe, steam turbine loading. It is appreciated that in other embodiments of the invention, attemperators as described above may not be utilized, but other means for independently controlling steam temperature from steam flow may be utilized. In one example applying these systems and methods to a boiler, the boiler firing may be altered in response to the steam temperature ramping rate parameter 210 and the steam flow may be controllable via one or more bypass valves in response to the steam flow ramping rate parameter 205. It is appreciated that any other suitable means for independently controlling steam temperature from steam flow may be utilized, which may be generally referred to herein by the term "attemperator."

FIG. 3 shows an example method 300 for loading a steam turbine using the above-described function, such as may be performed at least in part by a turbine controller, according to one embodiment. The method may begin at block 305, in which a function utilized to generate a ramp rate split factor (X), such as the function 225 described with reference to FIG. 2, is defined. As described, the function may be based at least in part on an operating state of the steam turbine, such as the exhaust temperature or superheat temperature, etc., and may generate the ramp rate split factor utilized to apportion the amount of ramping or loading of steam and ramping of temperature to the steam turbine.

Following block 305 is block 310, in which the turbine loading factor, such as the turbine loading factor 220 described with reference to FIG. 2, is received, or otherwise obtained, by the turbine controller. As described, the loading factor may generally represent the overall loading profile for the steam turbine at that time, without necessarily taking into consideration the ratio of steam loading or ramping versus temperature ramping.

Following block 310 is block 315, in which, according to one embodiment, the current exhaust temperature of the turbine is obtained. As described with reference to FIG. 2, the ramp rate split factor (X) as defined by the function of block 305 may be dependent upon a current operating state or parameter of the steam turbine. In other embodiments, instead of, or in addition to, exhaust temperature, exhaust pressure, humidity measurements, etc., may be utilized.

Following block 315 is block 320, in which the steam flow ramping rate is determined based on the ramp rate split factor (X) and the turbine loading factor. For example, according to one embodiment, the steam flow ramping rate may be the product of the ramp rate split factor (X) and the turbine loading factor. Similarly, at block 325, the steam temperature ramping rate is determined based on the ramp rate split factor (X) and the turbine loading factor. For example, according to one embodiment, the steam flow ramping rate may be determined by multiplying the difference of one minus the ramp rate split factor (X) by the turbine loading factor. Thus, the steam flow and temperature ramping rates are defined as having an inverse relationship—as temperature ramping increases, steam flow ramping decreases, and vice versa.

At blocks 330 and 335, steam flow and temperature ramping of the steam turbine are controlled by the turbine controller based on the steam flow ramping rate and the steam temperature ramping rate determined at blocks 320 and 325. As described with reference to FIG. 1, one or more of the steam bypass paths can be controlled to control the rate of delivery of steam to the steam turbine. Similarly, one or more of the attemperators can be controlled to control the temperature of the steam delivered.

The method 300 may end after block 335, having apportioned steam flow and temperature ramping during loading of the turbine. It is appreciated that the method 300 may be performed iteratively during the loading cycle of the steam turbine (and/or during any other operation states), such that after adjusting the bypass paths and/or attemperators at blocks 330 and 335, the method may repeat to block 305, or back to block 310. If repeating back to block 305, it may be possible to redefine the relationship between the steam flow and temperature ramping, such that the function to generate the ramp rate split factor (X) may be redefined. This may be redefined if turbine operating states change, if ambient conditions change, or if new or different constraints are provided to the system.

Figure 4:
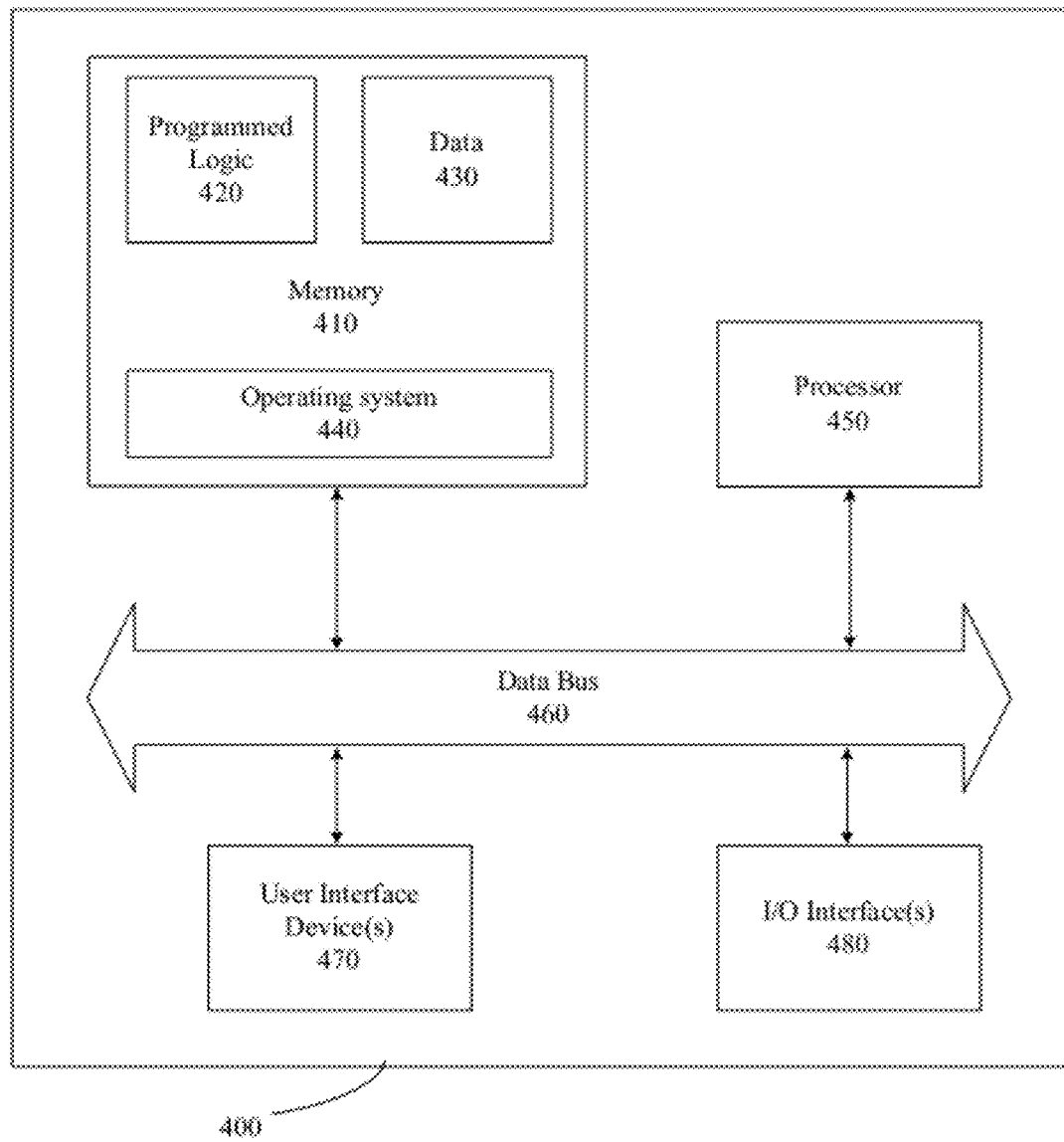
FIG. 4 is block diagram illustrating a controller for modeling and/or controlling a turbine, according to an embodiment.

FIG. 4 illustrates by way of a block diagram an example turbine controller 400 used to facilitate loading of the steam turbine, according to an illustrative embodiment. More specifically, the elements of the computerized controller 400 may be used to generate, store, and operate the turbine control profiles and the relationship between the steam flow and temperature ramping, as described with reference to FIGS. 1-3, in addition to facilitating turbine control, including generating and delivering control commands to steam bypass paths and attemperators. The computerized controller 400 may include a memory 410 that stores programmed logic 420 (e.g., software) and may store data 430, such as sensed operating parameters, operating profiles, mathematical functions, and the like. The memory 410 also may include an operating system 440. A processor 450 may utilize the operating system 440 to execute the programmed logic 420, and in doing so, also may utilize the data 430. A data bus 460 may provide communication between the memory 410 and the processor 450. Users may interface with the controller 400 via at least one user interface device 470 such as a keyboard, mouse, control panel, or any other devices capable of communicating data to and from the controller 400. The controller 400 may be in communication with the steam turbine online while operating, as well as in communication with the gas turbine offline while not operating, via an I/O Interface 480. More specifically, one or more of the controllers 400 may carry out the methods described with reference to FIGS. 2-3, including defining mathematical relationships, analyzing turbine loading profiles according to the relationships, and generating control commands for use during steam turbine loading (and/or during other operating states of the turbine). Additionally, it should be appreciated that other external devices, multiple other steam turbines, and or other components of the combined cycle power generation system may be in communication with the controller 400 via the I/O Interface 480. In the illustrated embodiment, the controller 400 may be located remotely with respect to the steam turbine; although, it may be co-located or even integrated with the steam turbine. Further the controller 400 and the programmed logic 420 implemented thereby may include software, hardware, firmware, or any combination thereof. It should also be appreciated that multiple controllers 400 may be used, whereby different features described herein may be executed on one or more different controllers 400.

Accordingly, embodiments described herein allow controlling the ramping rates of steam flow and temperature to a steam turbine according to a predefined relationship therebetween. These systems and methods achieve the technical effect of maximizing turbine output power without violating individual steam turbine constraints. Another technical effect achieved by these systems and methods includes the prevention of moisture development during start-up and loading by controlling the steam and the temperature ramping according to a defined relationship. This provides for increased power production during the early stages of steam turbine startup, as well as reduced losses resulting from erosion in the high pressure section of the steam turbine.

References are made to block diagrams of systems, methods, apparatuses, and computer program products according to example embodiments of the invention. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc., that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the invention may be embodied in many forms and should not be limited to the example embodiments described above. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for loading a steam turbine, the method comprising:
   receiving a turbine loading factor;
   receiving a current steam turbine exhaust temperature;
   determining, by a controller, a steam flow ramping rate parameter and a steam temperature ramping rate parameter based at least in part on the turbine loading factor and the current steam turbine exhaust temperature,
      wherein the steam flow ramping rate parameter and the steam temperature ramping rate parameter are determined based at least in part on an inverse relationship between the steam flow ramping rate parameter and the steam temperature ramping rate parameter,
      wherein determining the steam flow ramping rate parameter and the steam temperature ramping rate parameter comprises defining a function that generates a ramp rate split factor (X) that increases along a positive slope as the current steam turbine exhaust temperature increases between two predefined temperatures, wherein the steam flow ramping rate parameter and the steam temperature ramping rate parameter are determined based on the ramp rate split factor (X); and
   controlling at least one of: (a) steam flow to the steam turbine based at least in part on the steam flow ramping rate parameter; or (b) steam temperature to the steam turbine based at least in part on the steam temperature ramping rate parameter.

2. The method of claim 1, wherein determining the steam flow ramping rate parameter and the steam temperature ramping rate parameter are based on a function that, as the current steam turbine exhaust temperature increases, the temperature steam ramping rate parameter decreases and the steam flow ramping rate parameter increases.

3. The method of claim 1, wherein determining the steam flow ramping rate parameter and the steam temperature ramping rate parameter are based on a function that, as the current steam turbine exhaust temperature decreases, the temperature steam ramping rate parameter increases and the steam flow ramping rate parameter decreases.

4. The method of claim 1, wherein controlling steam temperature to the steam turbine comprises adjusting one or more attemperators based at least in part on the steam temperature ramping rate parameter.

5. The method of claim 1, wherein the steam flow ramping rate parameter is determined by multiplying the turbine loading factor by the ramp rate split factor (X).

6. The method of claim 1, wherein the steam temperature ramping rate parameter is determined by multiplying the turbine loading factor by (1-the ramp rate split factor (X)).

7. The method of claim 1, wherein the function is defined by a linear equation.

8. The method of claim 1, wherein the function is defined by a non-linear equation.

9. The method of claim 1, wherein the steam flow ramping rate parameter comprises a measurement of the rate of change to increase steam flow to the steam turbine, and wherein the steam temperature ramping rate parameter comprises a measurement of the rate of change to increase steam temperature to the steam turbine.

10. The method of claim 1, wherein controlling steam flow to the steam turbine comprises adjusting one or more steam bypass paths based at least in part on the steam flow ramping rate parameter.

11. A system for loading a steam turbine, the system comprising:
- a controller in communication with one or more temperature sensors associated with a steam turbine exhaust path, one or more steam bypass paths between a gas turbine and the steam turbine, and one or more attemperators of the steam turbine, wherein the controller is operable to:
- receive a turbine loading factor;
- receive a current steam turbine exhaust temperature from the one or more temperature sensors associated with the steam turbine exhaust path;
- determine a steam flow ramping rate parameter and a steam temperature ramping rate parameter based at least in part on the turbine loading factor and the current steam turbine exhaust temperature, wherein the steam flow ramping rate parameter and the steam temperature ramping rate parameter are determined based at least in part on an inverse relationship between the steam flow ramping rate parameter and the steam temperature ramping rate parameter; and
- control at least one of: (a) steam flow to the steam turbine based at least in part on the steam flow ramping rate parameter; or (b) steam temperature to the steam turbine based at least in part on the steam temperature ramping rate parameter.

12. The system of claim 11, wherein the controller further comprises a function for determining the steam flow ramping rate parameter and the steam temperature ramping rate parameter that, as the current steam turbine exhaust temperature increases, the temperature steam ramping rate parameter decreases and the steam flow ramping rate parameter increases.

13. The system of claim 11, wherein, to control the steam flow to the steam turbine the controller causes adjustment of one or more steam bypass paths based at least in part on the steam flow ramping rate parameter; and wherein to control the steam temperature to the steam turbine the controller causes adjustment of one or more attemperators based at least in part on the steam temperature ramping rate parameter.

14. The system of claim 11, wherein the controller further comprises a function for determining the steam flow ramping rate parameter and the steam temperature ramping rate parameter that, as the current steam turbine exhaust temperature decreases, the temperature steam ramping rate parameter increases and the steam flow ramping rate parameter decreases.

15. The system of claim 11, wherein the controller further comprises a function for determining the steam flow ramping rate parameter and the steam temperature ramping rate parameter that generates a ramp rate split factor (X) that increases along a positive slope as the current steam turbine exhaust temperature increases between two predefined temperatures, wherein the steam flow ramping rate parameter is determined by multiplying the turbine loading factor by the ramp rate split factor (X); and wherein the steam temperature ramping rate parameter is determined by multiplying the turbine loading factor by (1-the ramp rate split factor (X)).

16. The system of claim 15, wherein the function is defined by a linear equation.

17. The system of claim 15, wherein the function is defined by a non-linear equation.

18. The system of claim 11, wherein the steam flow ramping rate parameter comprises a measurement of the rate of change to increase steam flow to the steam turbine, and wherein the steam temperature ramping rate parameter comprises a measurement of the rate of change to increase steam temperature to the steam turbine.

19. A method for loading a steam turbine, the method comprising:
- determining, by a controller, a steam flow ramping rate parameter and a steam temperature ramping rate parameter based at least in part on a turbine loading factor and a current steam turbine exhaust temperature,
- defining a linear relationship between the steam flow ramping rate and the steam temperature ramping rate, wherein the relationship comprises a function that generates a ramp rate split factor (X) that increases along a positive slope as a current steam turbine exhaust temperature increases between two predefined temperatures, wherein the steam flow ramping rate parameter and the steam temperature ramping rate parameter are determined based on the ramp rate split factor (X);
- adjusting, by a controller, the rate of increase of a steam flow rate to a steam turbine during loading based on the linear relationship; and
- adjusting the rate of increase of a steam temperature to the steam turbine during loading based on the linear relationship.

* * * * *